(12) United States Patent
Brown et al.

(10) Patent No.: US 7,698,951 B2
(45) Date of Patent: Apr. 20, 2010

(54) PRESSURE-SENSOR APPARATUS

(75) Inventors: Gregory C. Brown, Chanhassen, MN (US); Curtis Rahn, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/127,641

(22) Filed: May 27, 2008

(65) Prior Publication Data

US 2009/0293628 A1 Dec. 3, 2009

(51) Int. Cl.
*G01L 9/00* (2006.01)

(52) U.S. Cl. .......................... 73/714; 73/715

(58) Field of Classification Search ............. 73/716, 73/736, 718, 726, 720
See application file for complete search history.

(56) References Cited

U.S. PATENT DOCUMENTS

| | | | | |
|---|---|---|---|---|
| 3,296,868 A | * | 1/1967 | Koppel et al. ................. 73/716 |
| 3,712,143 A | * | 1/1973 | Weaver et al. ................. 73/720 |
| 4,176,557 A | * | 12/1979 | Johnston ...................... 73/708 |
| 4,928,376 A | | 5/1990 | Poglitsch | |
| 5,852,244 A | | 12/1998 | Englund et al. | |
| 5,999,082 A | | 12/1999 | Kurtz et al. | |
| 6,272,928 B1 | * | 8/2001 | Kurtz .......................... 73/721 |
| 6,418,793 B1 | * | 7/2002 | Pechoux et al. ............... 73/714 |
| 6,789,429 B2 | * | 9/2004 | Pinto et al. .................... 73/718 |

* cited by examiner

*Primary Examiner*—Andre J Allen
(74) *Attorney, Agent, or Firm*—Fogg & Powers LLC

(57) ABSTRACT

A sensing apparatus for determining the pressure of a fluid includes first and second support members. The first and second support members are configured to define at least one sealed chamber. A flexible diaphragm is disposed between the first and second support members. The diaphragm includes first and second opposing surfaces. The first opposing surface is in fluid communication with a first fluid-flow circuit, and the second opposing surface is in fluid communication with a second fluid-flow circuit. A first electronic circuit is disposed within the at least one chamber and coupled to the diaphragm for sensing a first differential pressure associated with the first and second flow circuits. The first electronic circuit is configured to produce at least one electrical signal proportional to a magnitude of the first differential pressure.

18 Claims, 3 Drawing Sheets

PRESSURE-SENSOR APPARATUS

BACKGROUND OF THE INVENTION

When sensing pressure in aerospace or other commercial systems, it is often necessary to isolate the process fluid (e.g., fuel) from the electronic sensing elements on the pressure sensor. The usual practice for doing so consists of employing a thin corrugated metal barrier that covers a cavity that houses the pressure sensor electronic sensing elements. This cavity is then filled will inert oil and sealed, providing a means to couple the process-fluid pressure to the sensor, but at the same time isolating the sensor from the process fluid itself.

Process fluids can be chemically destructive to the sensing element or be conductive, which provides unwanted current leakage in the sensor elements. The described isolators introduce non-correctable errors that increase approximately to the diameter ratio to the third power as the diameter of the isolator is decreased. Additionally, the oil fill has limitations with temperature swing; most oil fills that work at higher temperatures are gels at cold temperatures. In addition, the oil fill presents an additional failure mechanism; if the oil leaks out of the sensor, the sensor can no longer measure pressure and fails.

SUMMARY OF THE INVENTION

In an embodiment, a sensing apparatus for determining the pressure of a fluid includes first and second support members. The first and second support members are configured to define at least one sealed chamber. A flexible diaphragm is disposed between the first and second support members. The diaphragm includes first and second opposing surfaces. The first opposing surface is in fluid communication with a first fluid-flow circuit, and the second opposing surface is in fluid communication with a second fluid-flow circuit. A first electronic circuit is disposed within the at least one chamber and coupled to the diaphragm for sensing a first differential pressure associated with the first and second flow circuits. The first electronic circuit is configured to produce at least one electrical signal proportional to a magnitude of the first differential pressure.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

An embodiment of the invention has full differential-pressure and gauge-pressure capability without exposing sensor elements to process fluid.

Figure 1:
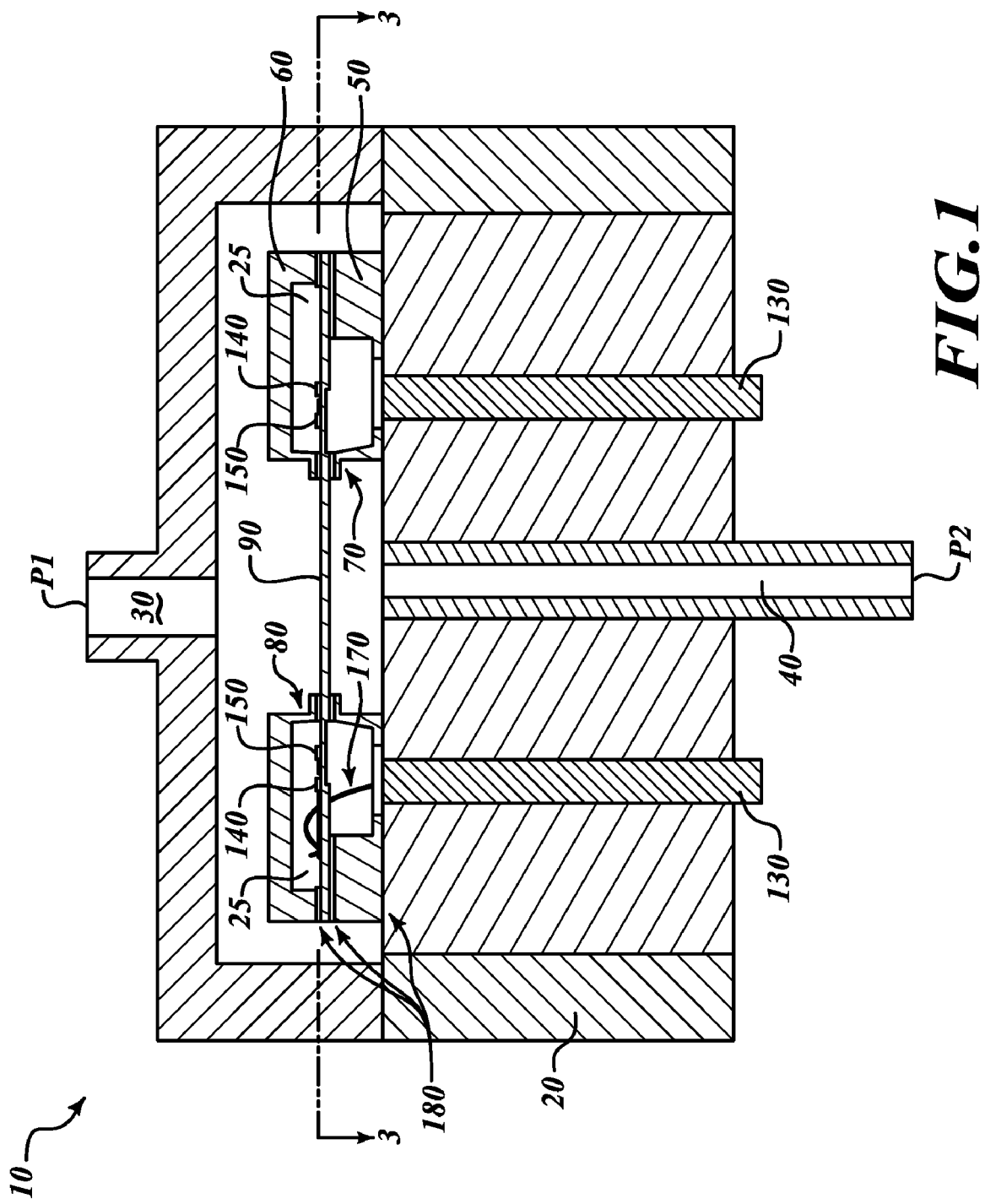
FIG. 1 is a cross-sectional schematic view of a pressure-sensing module according to an embodiment of the present invention.

Referring to FIG. 1, a pressure-sensing module 10 includes a header housing 20 including a first (higher-pressure) port 30 and a second (lower-pressure) port 40. The first port 30 is configured to be in fluid communication with a first fluid-flow circuit, such as that associated with the aforementioned process fluid, having a variable or static pressure P1. The second port 40 is configured to be in fluid communication with a second fluid-flow circuit, which may be the ambient, having a variable or static pressure P2. The second port 40 may be achieved by glassing a tube in the housing 20.

The module 10 further includes a first support member 50 and a second support member 60, each of which has a respective flexible clamping portion 70, 80, and the combination of which define at least one sealed chamber 25. A flexible diaphragm 90 is disposed between the first and second support members 50, 60. Alternatively, a unitary support structure (not shown) may be substituted, while retaining full functionality, for the first and second support members 50, 60. As illustrated in FIG. 1, the diaphragm 90 is thus in fluid communication on its top side with the pressure PI and on its bottom side with the pressure P2.

Figure 2:
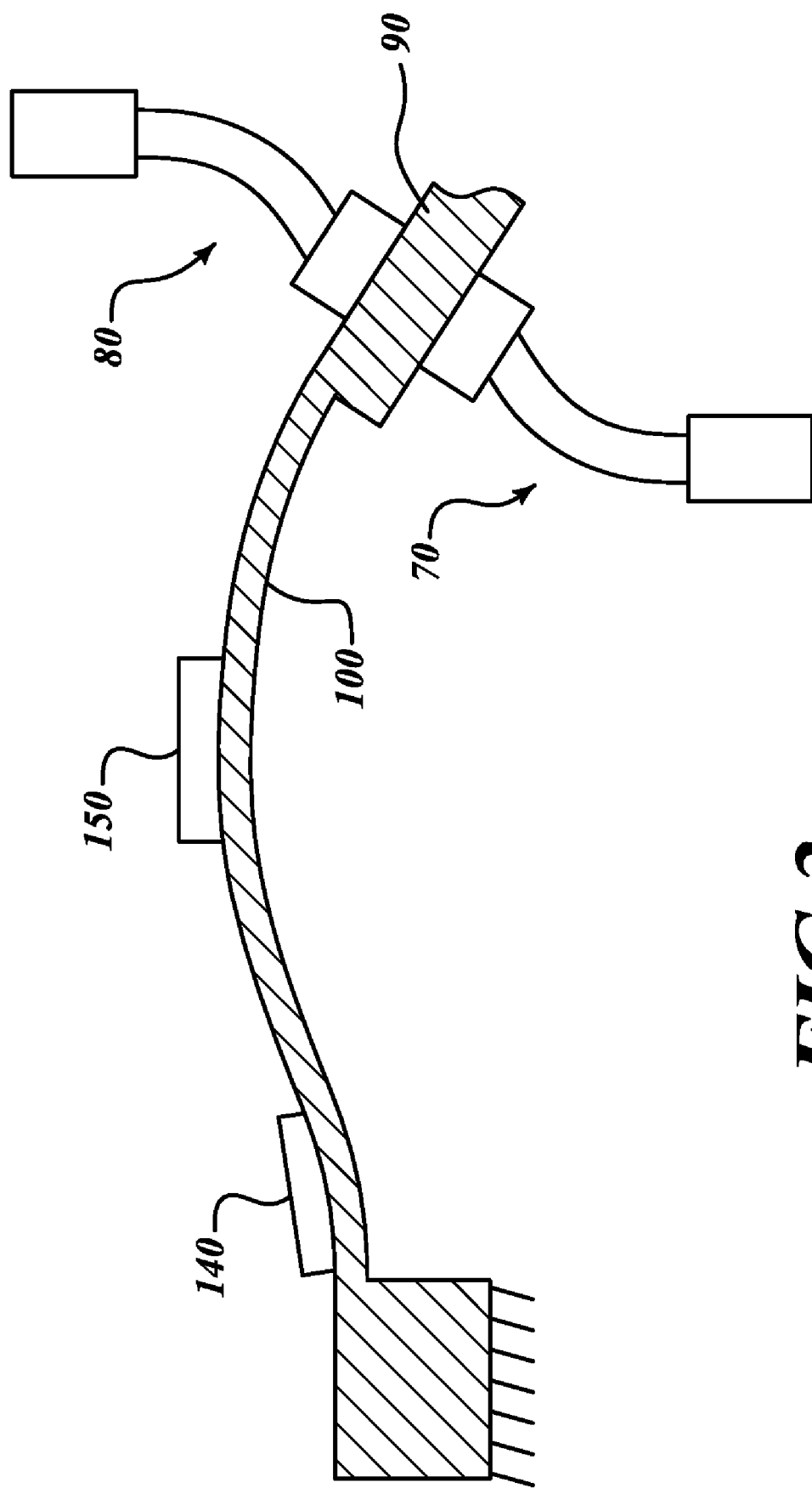
FIG. 2 is a cross-sectional schematic view of a portion of the module illustrated in FIG. 1.
Figure 3:
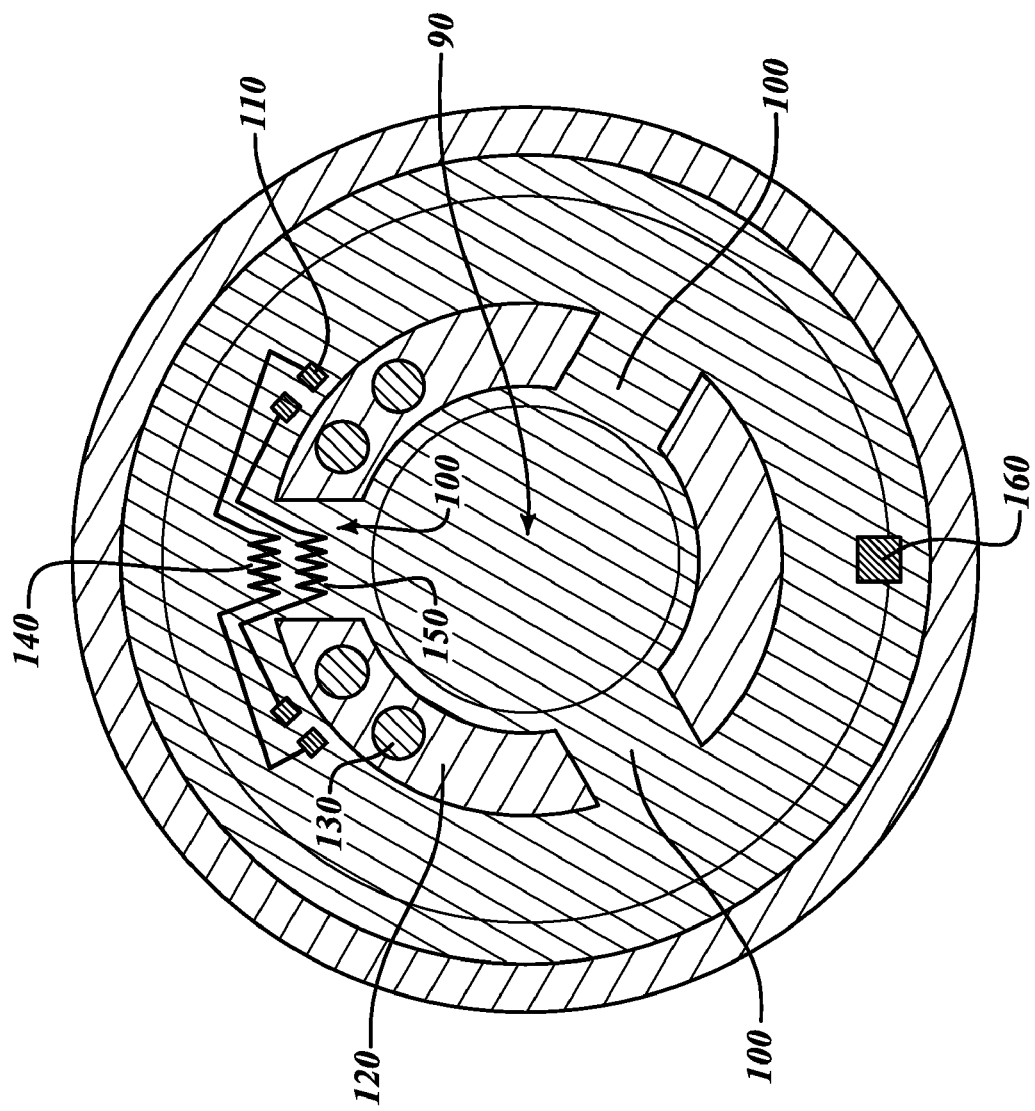
FIG. 3 is a top schematic view along line 3-3 illustrated in FIG. 1 of an apparatus according to an embodiment of the present invention.

As best seen in FIG. 3, the diaphragm 90 includes one or more sensing flexures 100 positioned on the periphery of the diaphragm 90. Wire bond pads 110 are provided in at least one of the flexure regions 100. Connected to the pads 110, in an embodiment, is a strain-gauge including one or more piezoelectric resistance-bridge sensing elements 140, 150 that may be built on a silicon On insulator structure. It should be noted that, while FIG. 3 illustrates the presence of strain-gauge elements on only one flexure 100 of the diaphragm 90, embodiments of the invention may include multiple such strain gauges on multiple ones of the flexures 100. As best illustrated in FIG. 2, and in an embodiment, legs of the bridge elements are positioned so that the "+" legs 150 are on flexure 100 areas of maximum tension, and the "−" legs 140 are on flexure areas of minimum tension. Note that the clamping portions 70, 80 deform corresponding to deformation of the diaphragm 90. In an embodiment, and as illustrated in FIG. 3, a bridge 160 or other element know in the art, and operable to sense temperature, is disposed proximate to the strain sensing elements 140, 150. The temperature bridge 160 provides reliable digital pressure compensation over an extended temperature range.

The diaphragm 90 may include one or more perforations 120 inside the sealed chamber to allow access to header pins 130. These header pins 130 may be wire bonded to the pads 110 in the flexure area. The pins 130 may provide external connection to the sensing elements via, for example, a wire 170.

In an embodiment, pressure P1 and/or P2 is applied to the sensing diaphragm 90, which will deflect proportionally to such pressure. As the sensing diaphragm 90 deflects, the flexures 100 allow strain to propagate to the sensing elements 140 150, which, in turn, generate at least one electrical signal proportional to the magnitude of the sensed differential and/or gauge pressure.

The SOI substrate allows high temperature operation (e.g., >250C) by eliminating the parasitic diodes associated with bulk structures. In a preferred embodiment, silicon to silicon joints are achieved by making one or more thermal electric bonds 180 between a layer of pyrex and silicon. Alternative joining technologies may be brazing or silicon-diffusion bonding.

In a preferred embodiment, the sealed chamber 25 containing the sensing elements 140, 150 would be held at a vacuum or backfilled with inert gas.

Features of one or more embodiments include:

Capability of measuring pressures up to 2000 psi.

Capability of pressure measurements at a temperature of up to 275 C.

Provides high sensitivities of >5%.

Integral stress-isolation member is built into the structure eliminating the need for a stress isolation member external to the die.

Environmentally protected areas are available near the sensing elements 140, 150 for providing integral multi-chip module capability. In this way, transducer circuitry could be included to allow ultra miniature transducer functionality.

Sensors built with this construction are inherently small in size, limited only by the die and header sizes.

Small sizes also allow minimal weight; ideal for size and weight sensitive applications like aerospace.

The lack of oil fill makes these sensors advantageous for differential-pressure applications where one leg operates near vacuum. Oil fills can outgas under these conditions, causing large measurement errors.

Absolute pressure silicon structures have been shown to provide excellent accuracy and stability when properly stress isolated.

A manufacturing process according to an embodiment is as follows: an embodiment is produced using three silicon layers. The diaphragm 90 and the flexures 100 are established by the middle layer. The bottom layer provides access to the header pins 130, provides stress isolation, and TE bonding to the header 20. The top layer may be a lid, which provides the isolation from the process fluid. Both the top and bottom layers provide continuous flexures that are substantially normal to the sensing diaphragm surface 90.

The middle layer may be fabricated first. The sensing elements 140, 150 are created, then the flexure 100 is thinned and the open channels 120 created.

The bottom layer may be next, which is fabricated by etching and polishing. The TE bond to the middle layer is then made. The resulting die is then masked, and the final geometry of the bottom layer flexure is etched. The wafer is then sawed into individual die. Each good die is TE Bonded into the mating header.

The top layer may be made last, with its features also formed by etching. The top layer is then sawed into individual die. The top structure is TE bonded into place last, creating the vacuum or inert atmosphere for the sensing elements 140, 150.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A sensing apparatus for determining the pressure of a fluid, the apparatus comprising:

first and second support members, the first and second support members configured to define at least one sealed chamber;

a flexible diaphragm disposed between the first and second support members, the diaphragm including first and second opposing surfaces, the first opposing surface being in fluid communication with a first fluid-flow circuit, and the second opposing surface being in fluid communication with a second fluid-flow circuit; and a first electronic circuit disposed within the at least one chamber and coupled to the diaphragm for sensing a first differential pressure associated with the first and second flow circuits, the first electronic circuit configured to produce at least one electrical signal proportional to a magnitude of the first differential pressure.

2. The apparatus of claim 1 wherein the first and second support members include respective flexible clamping portions configured to clamp the diaphragm between the first and second support members.

3. The apparatus of claim 1 wherein the electronic circuit is further configured to produce at least one electrical signal proportional to a magnitude of the gauge pressure associated with at least one of the first and second flow circuits.

4. The apparatus of claim 1 wherein the first and second support members are annular in configuration.

5. The apparatus of claim 1 wherein the electronic circuit comprises at least one resistance strain gauge.

6. The apparatus of claim 1 wherein the electronic circuit comprises at least one temperature sensor.

7. The apparatus of claim 1, further comprising a second electronic circuit contained within the at least one chamber and coupled to the diaphragm for sensing a second differential pressure associated with the first and second flow circuits, the second electronic circuit configured to produce at least one electrical signal proportional to a magnitude of the second differential pressure.

8. The apparatus of claim 1 wherein the at least one chamber is held at a vacuum state.

9. The apparatus of claim 1, wherein the circuit provides an electrical signal proportional to the temperature and provides correction for temperature errors and pressure non-linearity.

10. A pressure-sensing module, comprising:

a housing including first and second ports configured to be respectively coupled to first and second fluid-flow circuits;

first and second support members disposed within the housing, the first and second support members configured to define at least one sealed chamber;

a flexible diaphragm disposed between the first and second support members, the diaphragm including first and second opposing surfaces, the first opposing surface being in fluid communication with the first fluid-flow circuit, and the second opposing surface being in fluid communication with the second fluid-flow circuit; and an electronic circuit disposed within the at least one chamber and coupled to the diaphragm for sensing a differential pressure associated with the first and second flow circuits, the electronic circuit configured to produce at least one electrical signal proportional to a magnitude of the differential pressure.

11. The apparatus of claim 10 wherein the first and second support members include respective flexible clamping portions configured to clamp the diaphragm between the first and second support members.

12. The apparatus of claim 10 wherein the electronic circuit is further configured to produce at least one electrical signal proportional to a magnitude of the gauge pressure associated with at least one of the first and second flow circuits.

13. The apparatus of claim 10 wherein the first and second support members are annular in configuration.

14. The apparatus of claim 10 wherein the electronic circuit comprises at least one resistance strain gauge.

15. The apparatus of claim 10 wherein the electronic circuit comprises at least one temperature sensor.

16. The apparatus of claim 10, further comprising a second electronic circuit contained within the at least one chamber and coupled to the diaphragm for sensing a second differential pressure associated with the first and second flow circuits, the second electronic circuit configured to produce at least one electrical signal proportional to a magnitude of the second differential pressure.

17. The apparatus of claim 10 wherein the at least one chamber is held at a vacuum state.

18. The apparatus of claim 10, wherein the circuit provides an electrical signal proportional to the temperature and provides correction for temperature errors and pressure non-linearity.

* * * * *